United States Patent
Liu

(10) Patent No.: US 11,080,637 B2
(45) Date of Patent: Aug. 3, 2021

(54) UNIVERSAL MODEL SCORING ENGINE

(71) Applicant: PAYPAL, INC., San Jose, CA (US)

(72) Inventor: Yu Liu, Shanghai (CN)

(73) Assignee: PayPal, Inc., San Jose, CA (US)

(*) Notice: Subject to any disclaimer, the term of this patent is extended or adjusted under 35 U.S.C. 154(b) by 844 days.

(21) Appl. No.: 15/868,893

(22) Filed: Jan. 11, 2018

(65) Prior Publication Data

US 2019/0188615 A1 Jun. 20, 2019

Related U.S. Application Data

(63) Continuation of application No. PCT/CN2017/117120, filed on Dec. 19, 2017.

(51) Int. Cl.
G06F 17/10 (2006.01)
G06Q 10/06 (2012.01)
G06Q 20/40 (2012.01)
G06N 3/08 (2006.01)

(52) U.S. Cl.
CPC ....... *G06Q 10/0635* (2013.01); *G06Q 10/067* (2013.01); *G06Q 20/4014* (2013.01); *G06Q 20/4016* (2013.01); *G06N 3/08* (2013.01)

(58) Field of Classification Search
CPC ............ G06Q 10/0635; G06Q 10/067; G06Q 20/4014; G06Q 20/4016
USPC .......................................................... 703/1
See application file for complete search history.

(56) References Cited

U.S. PATENT DOCUMENTS

| 5,832,465 A | * | 11/1998 | Tom | G06N 20/00 706/51 |
| 10,558,913 B1 | * | 2/2020 | Turner | G06N 5/045 |
| 2002/0165841 A1 | * | 11/2002 | Quaile | G06N 5/048 706/45 |
| 2004/0225628 A1 | | 11/2004 | Aoki et al. | |
| 2012/0278249 A1 | | 11/2012 | Duggal et al. | |

FOREIGN PATENT DOCUMENTS

| CN | 105229596 | 1/2016 |
| CN | 105556552 | 5/2016 |
| CN | 106575400 | 4/2017 |
| CN | 107402921 | 11/2017 |

* cited by examiner

*Primary Examiner* — Andre Pierre Louis

(74) *Attorney, Agent, or Firm* — Haynes and Boone, LLP

(57) ABSTRACT

Methods and systems for generating a universal computer model for assessing a risk in an electronic transaction based on one or more risk assessment models are presented. The one or more risk assessment models may be incompatible with each other. Different portions of a risk assessment models may be extracted from the risk assessment models. A node structure is generated for each risk assessment model based on the portions extracted from a corresponding risk assessment model. The node structures generated based on the risk assessment models are merged to produce a merged node structure. The universal computer model is generated based on the merged node structure.

20 Claims, 10 Drawing Sheets

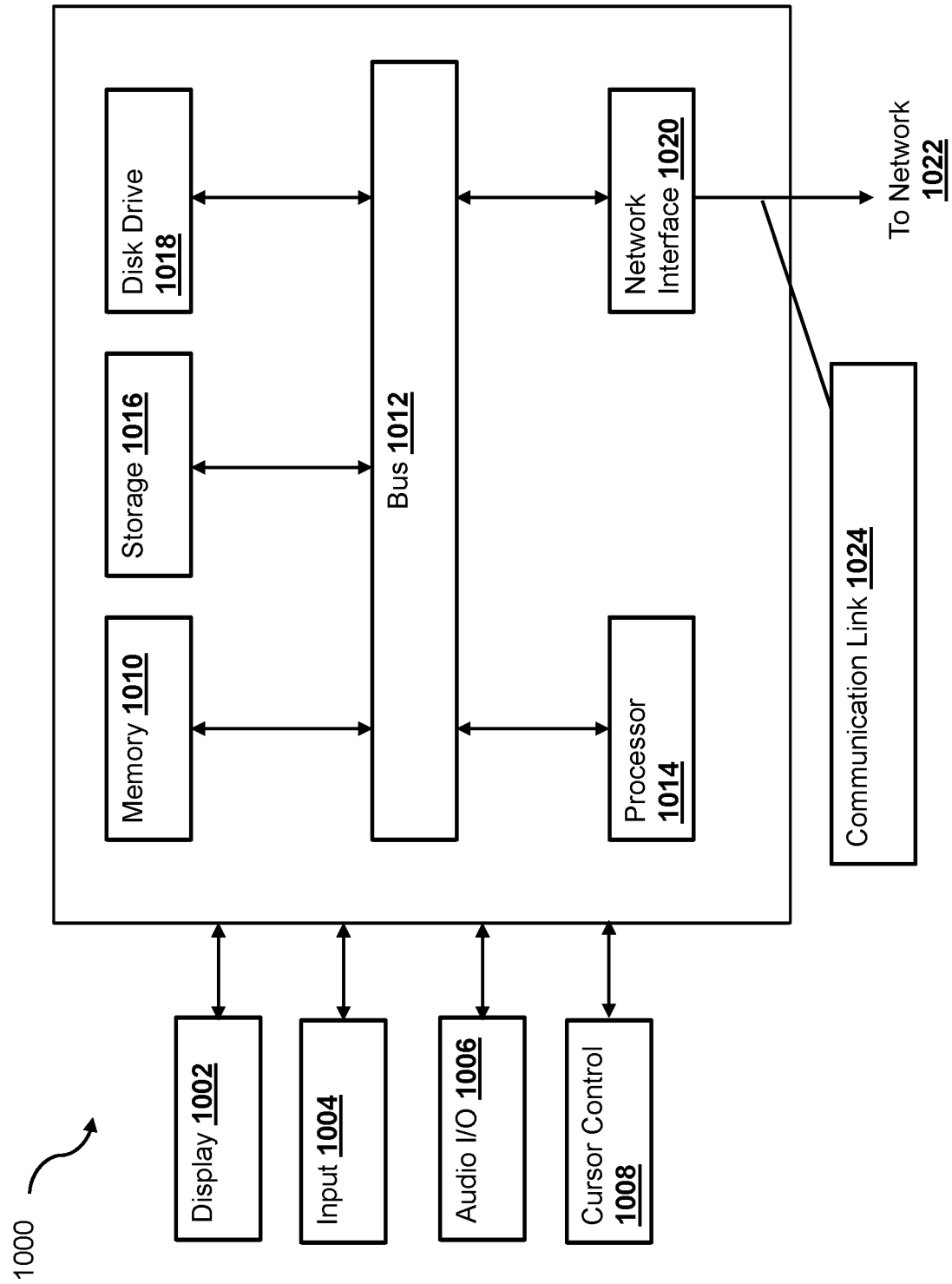

UNIVERSAL MODEL SCORING ENGINE

CROSS-REFERENCE TO RELATED APPLICATIONS

This application claims priority to and the benefit of International Patent Application No. PCT/CN2017/117120, filed on Dec. 19, 2017, the contents of which are hereby incorporated by reference herein in its entirety.

BACKGROUND

The present specification generally relates to risk assessment modeling, and more specifically to providing a universal computer model for risk assessment.

RELATED ART

Today, an entity such as a bank or a retail store that provides online services to users may receive millions of online transaction requests each day. In addition to providing adequate services to the online users, the entities also need to prevent unauthorized users from accessing legitimate user accounts. For example, malicious users are known to use various tactics such as phishing, man-in-the-middle-attacks, to obtain credentials associated with user accounts, and perform unauthorized transactions based on those user accounts. In these instances, the entities need to differentiate unauthorized requests from authorized ones such that the user accounts are protected from unauthorized access. For example, the entities may deny requests that are determined to be possibly unauthorized. By denying the unauthorized requests, more processing power may be spent on processing the authorized requests, thus improving the service performance and quality for the legitimate users, while reducing the amount of computational power needed for processing and then remedying unauthorized requests.

Conventionally, different types of risk assessment models may be developed that target different types of transactions or different types of fraud tactics. The different types of models may be implemented using different data formats, different model structures, and/or different interfaces, and in general are incompatible with each other. As a result, an entity dealing with different risks typically is required to develop different customized model engines to run the different risk assessment models. Constantly developing new model engines can be costly, and the incompatibility between risk assessment models prevents the entity from efficiently utilizing multiple risk assessment models in tandem to assess a risk of a transaction. Thus, there is a need for improving risk assessment modeling.

BRIEF DESCRIPTION OF THE FIGURES

FIG. 10 is a block diagram of a system for implementing a device according to an embodiment of the present disclosure.

Figure 1:
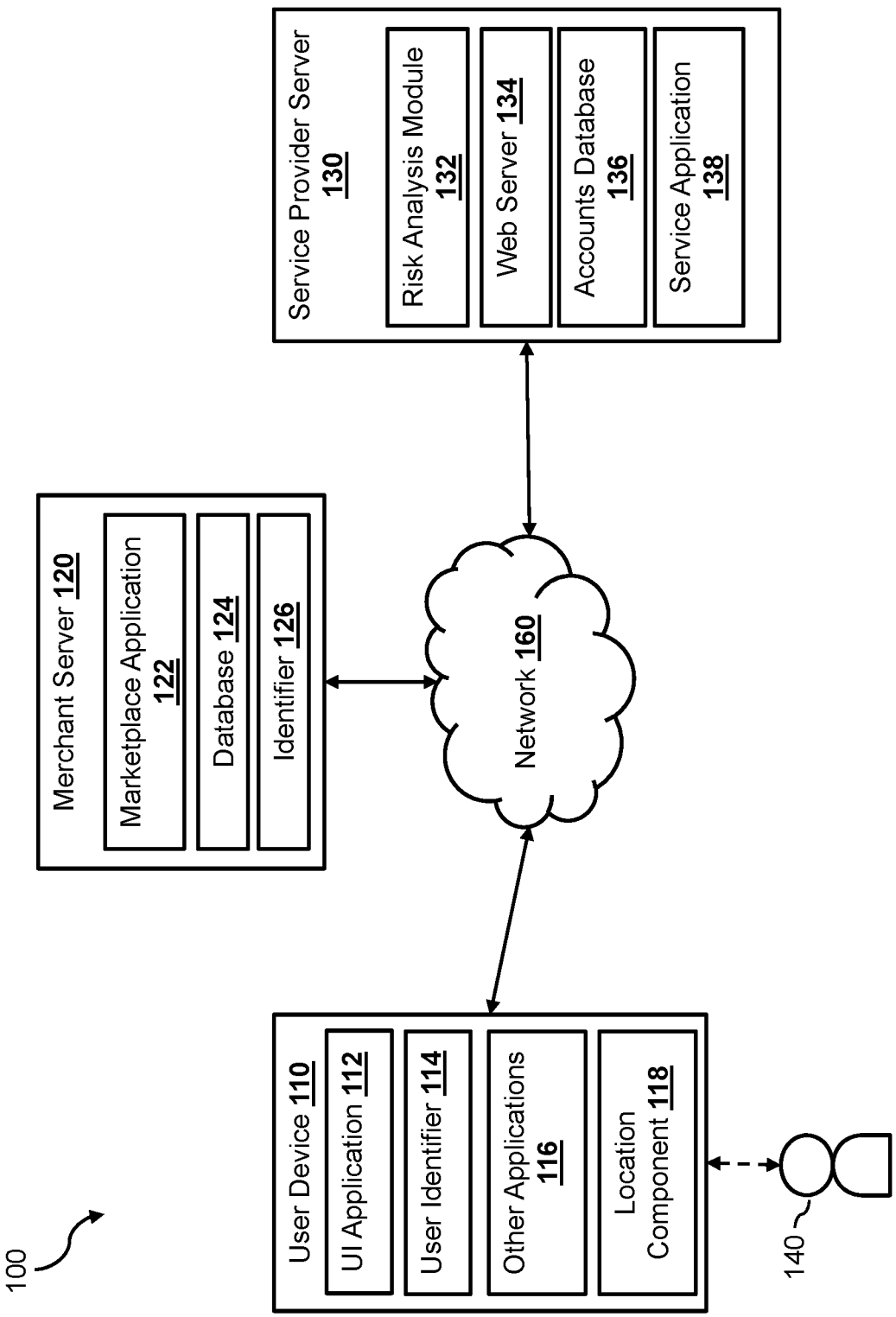
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for generating a universal computer model for assessing a risk in an electronic transaction (e.g., an electronic payment transaction) based on one or more risk assessment models. The one or more risk assessment models may be incompatible with each other. For example, the risk assessment models may be of different types of computer models, may have different interfaces to access the functionalities of the models, and/or may use different data formats and/or different scales for processing data. Furthermore, the one or more risk assessment models may be developed a priori for targeting a specific type of electronic transactions or a specific fraud tactic.

To generate the universal computer model, different portions of a risk assessment models may be extracted from the risk assessment models. In some embodiments, based on the computer model type of the risk assessment model, a corresponding extraction scheme is used to extract the different portions from the risk assessment model. For example, a first risk assessment model may be determined to be of a first type of computer model. Different portions of the first risk assessment model may then be extracted according to a first extraction scheme selected based on the determination that the first risk assessment model is of the first type of computer model. The different portions extracted from the first risk assessment model may correspond to one or more input elements of the first risk assessment model, one or more computation elements of the first risk assessment model, and an output element of the first risk assessment model.

A first node structure may be generated based on the different portions extracted from the first risk assessment model. According to one embodiment of the disclosure, the first node structure may include multiple nodes that are connected together, including at least a first input node, a first output node, and a first computation node. In some embodiments, the first input node may be generated based on the portion extracted from the first risk assessment model that corresponds to an input element (e.g., an input variable for the first assessment model). The first computation node may be generated based on the portion extracted from the first risk assessment model that corresponds to a computation element (e.g., a regression equation). The first output node may be generated based on the portion extracted from the first risk assessment model that corresponds to an output element (e.g., an output variable for the first assessment model). The universal computer model may then be generated based on the first node structure.

In some embodiments, the universal computer model may be generated based on multiple risk assessment models. In such embodiments, a second node structure may be generated based on different portions extracted from a second risk assessment model. As discussed above, the second risk assessment model may be of a second computer model that is different from the first computer model. Based on the determination that the second risk assessment model is of the second computer model, the different portions may be extracted from the second risk assessment model according to a second extraction scheme. The second node structure may then be generated based on the different portions extracted from the second risk assessment model, in a manner similar to generating the first node structure. For example, the second node structure may include a second input node that corresponds to an input element extracted from the second risk assessment model, a second computation node that corresponds to a computation element extracted from the second risk assessment model, and a second output node that corresponds to an output element extracted from the second risk assessment model.

The first node structure and the second node structure may be merged to produce a merged node structure. In some embodiments, merging the first node structure and the second node structure may include determining that the first input node and the second input node correspond to input elements of the same type, and combining the first input node and the second input node in the merged node structure. An additional recursion node may also be added in the merged node structure to combine the outputs from the first node structure and the second node structure. The universal computer model may then be generated based on the merged node structure.

FIG. 1 illustrates an electronic transaction system 100 according to one embodiment of the disclosure. The electronic transaction system 100 includes a service provider server 130, a merchant server 120, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to log in to a user account to conduct electronic transactions (e.g., logins, access content, transfer data or content, add new funding sources, account transfers, or payments) with the service provider server 130. Similarly, a merchant associated with the merchant server 120 may use the merchant server 120 to log in to a merchant account to conduct electronic transactions (e.g., logins, payment transactions, etc.) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser), which may be utilized by the user 140 to conduct electronic transactions (e.g., logins, payment, account services, etc.) with the service provider server 130 over the network 160. In one aspect, purchase expenses may be directly and/or automatically debited from an account related to the user 140 via the user interface application 112.

In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one user identifier 114, which may be implemented, for example, as operating system registry entries, cookies associated with the user interface application 112, identifiers associated with hardware of the user device 110 (e.g., a media control access (MAC) address), or various other appropriate identifiers. The user identifier 118 may include one or more attributes related to the user 140 of the user device 110, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the user identifier 114 may be passed with a user login request to the service provider server 130 via the network 160, and the user identifier 114 may be used by the service provider server 130 to associate the user with a particular user account maintained by the service provider server 130.

In various implementations, the user 140 is able to input data and information into an input component (e.g., a keyboard) of the user device 110 to provide user information with an electronic transaction request, such as a login request, a fund transfer request, a request for adding an additional funding source (e.g., a new credit card), or other types of request. The user information may include user identification information.

The user device 110, in various embodiments, includes a location component 118 configured to determine, track, monitor, and/or provide an instant geographical location of the user device 110. In one implementation, the geographical location may include GPS coordinates, zip-code information, area-code information, street address information, and/or various other generally known types of location information. In one example, the location information may be directly entered into the user device 110 by the user via a user input component, such as a keyboard, touch display, and/or voice recognition microphone. In another example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used. For example, location information may be obtained by checking in using the user device 110 via a check-in device at a location, such as a beacon. This helps to save battery life and to allow for better indoor location where GPS typically does not work.

Even though only one user device 110 is shown in FIG. 1, it has been contemplated that one or more user devices (each similar to user device 110) may be communicatively coupled with the service provider server 130 via the network 160 within the system 100.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 122, in one embodiment, may include a marketplace application 122, which may be configured to provide information over the network 160 to the user interface application 112 of the user device 110. For example, the user 140 of the user device 110 may interact with the marketplace application 122 through the user interface application 112 over the network 160 to search and view various items available for purchase in the merchant database 124.

The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of various services offered by the service provider to a merchant, such as payment intermediary between customers of the merchant and the merchant itself. For example, the merchant server 120 may use an application programming interface (API) that allows it to offer sale of goods in which customers are allowed to make payment through the service provider server 130, while the user 140 may have an account with the service provider server 130 that allows the user 140 to use the service provider server 130 for making payments to merchants that allow use of authentication, authorization, and payment services of the service provider as a payment intermediary. The merchant may also have an account with the service provider server 130. Even though only one merchant server 120 is shown in FIG. 1, it has been contemplated that one or more merchant servers (each similar to merchant server 120) may be communicatively coupled with the service provider server 130 and the user device 110 via the network 160 in the system 100.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc., of San Jose, Calif., USA, and/or one or more service entities that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to serve web content to users in response to HTTP requests. As such, the web server 134 may include pre-generated web content ready to be served to users. For example, the web server 134 may store a log-in page, and is configured to serve the log-in page to users for logging into user accounts of the users to access various service provided by the service provider server 130. The web server 134 may also include other webpages associated with the different services offered by the service provider server 130. As a result, a user may access a user account associated with the user and access various services offered by the service provider server 130, by generating HTTP requests directed at the service provider server 130.

In various embodiments, the service provider server includes a risk analysis module 132 that is configured to determine whether to authorize or deny an incoming request from the user device 110 or from the merchant server 120. The request may be a log-in request, a fund transfer request, a request for adding an additional funding source, a request to access or view content, a request to transfer data or content, or other types of requests associated with the variety of services offered by the service provider server 130. As such, when a new request is received at the service provider server 130 (e.g., by the web server 134), the risk analysis module 132 may analyze (or evaluate) the request and determine whether to authorize of deny the request. The risk analysis module 132 may transmit an indication of whether to authorize or deny the request to the web server 134 and/or the service application 138 such that the web server 134 and/or the service application 138 may process (e.g., authorize or deny) the request based on the indication.

The service provider server 130, in one embodiment, may be configured to maintain one or more user accounts and merchant accounts in an account database 136, each of which may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account, which may be used by the risk analysis module 132 to determine whether to authorize or deny a request associated with the user account. In certain embodiments, account information also includes user purchase profile information such as account funding options and payment options associated with the user, payment information, receipts, and other information collected in response to completed transactions.

User purchase profile information may be compiled or determined in any suitable way. In some instances, some information is solicited when a user first registers with a service provider. The information might include demographic information, a survey of purchase interests, and/or a survey of past purchases. In other instances, information may be obtained from other databases. In certain instances, information about the user and products purchased are collected as the user shops and purchases various items.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130.

Figure 2:
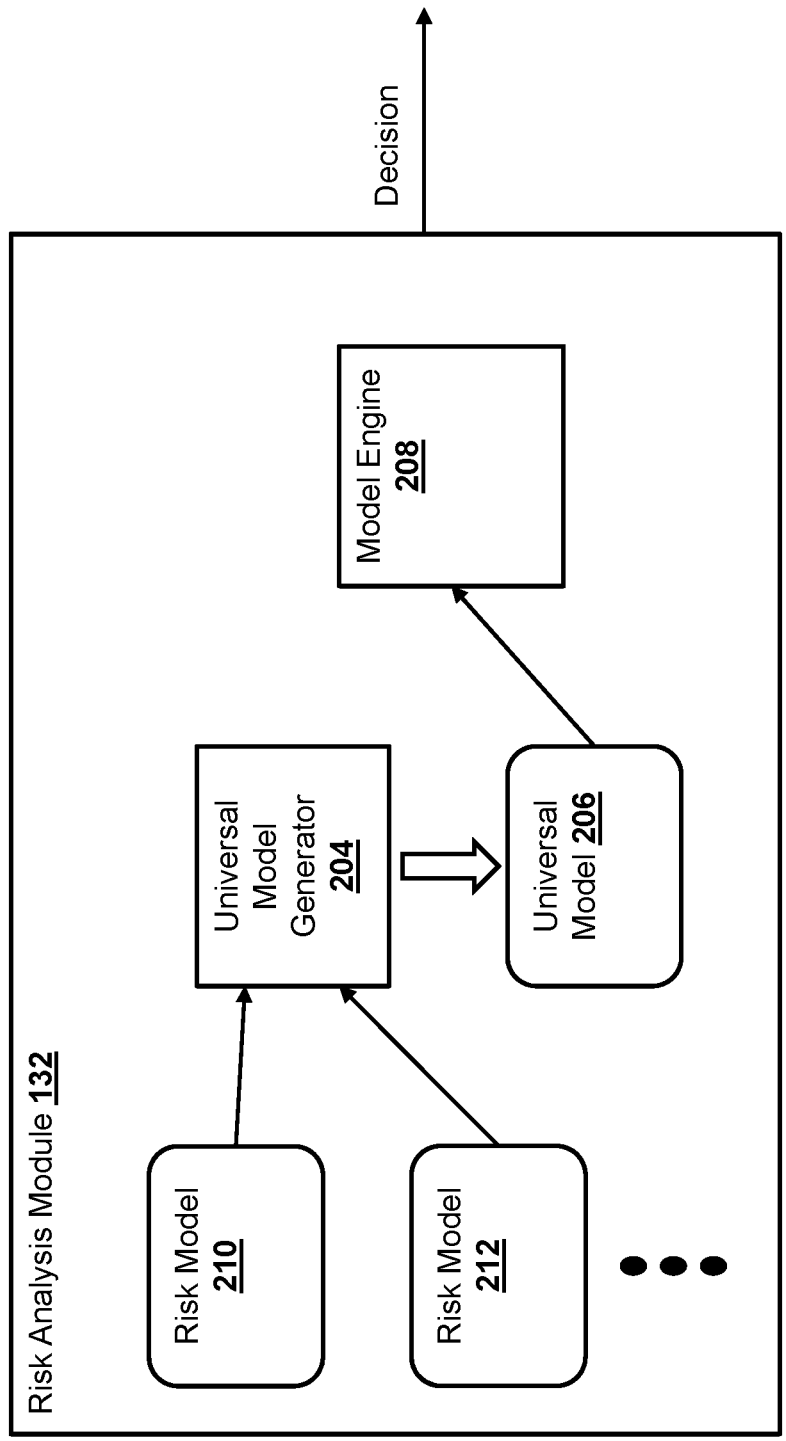
FIG. 2 is a block diagram illustrating a risk analysis module according to an embodiment of the present disclosure.

FIG. 2 illustrates a block diagram of the risk analysis module 132 according to an embodiment of the disclosure. The risk analysis module 132 includes multiple risk assessment models, such as a risk assessment model 210 and a risk assessment model 212, a universal model generator 204, and a model engine 208. The risk assessment models 210 and 212 may be received or obtained from another module of the service provider server 130 or from an external source. For example, each of the risk assessment models 210 and 212 may be an output from a model generation tool such as the R model building environment, the Scikit-Learn machine learning model building tool, the TensorFlow model building tool, etc. Each of the risk assessment models 210 and 212 may be configured to receive a set of inputs related to an electronic transaction request. The set of inputs may include information such as a transaction amount, a transaction history of the user account related to the transaction request, an Internet Protocol (IP) address of a source device that initiates the transaction request, a number of successful transactions with the user account within a predetermined period of time, a number of failed transactions with the user account within the predetermined period of time, a time, a browser type, a device type, and a transaction type of the transaction, and other information related to the transaction request. Some of the information may be obtained from the electronic transaction request itself while other information may be obtained from sources such as the from user device that initiates the electronic transaction request, from other modules within the service provider server such as the web server 134, the accounts database 136, and the service application 138, from the merchant server 120, and/or from other external sources over the network 160.

The risk assessment model may be configured to perform a set of computations on the set of inputs and generate an output. Some of the risk assessment models 210 and 212 may produce a binary output indicating whether transaction is likely to be a fraudulent transaction. Other risk assessment models may produce a score that indicates a likelihood that the transaction is a fraudulent transaction (e.g., in a percentage where a higher percentage indicates a higher likelihood that the transaction is a fraudulent transaction).

In some embodiments, each of the risk assessment models 210 and 212 may target a particular transaction type or a particular fraud tactic. For example, the risk assessment model 210 may be generated to target a payment transaction. As such, the risk assessment model 210 may be specialized in assessing risks in payment transactions. On the other hand, the risk assessment model 212 may be generated to target a login transaction, and is specialized in evaluating risks in login transactions. In some other embodiments, instead of targeting a particular type of transactions, each of the risk assessment models 210 and 212 may target a particular fraud tactic. For example, the risk assessment model 210 may be generated to target a phishing tactic, and is specialized in recognizing transactions that are initiated as a result of phishing attacks. On the other hand, the risk assessment model 212 may be generated to target "man-in-the-middle" attacks, and is specialized in recognizing transactions that are initiated as a result of "man-in-the-middle" attacks.

Different risk assessment models may be implemented using different types of computer models. Example types of computer models include a regression model type, a neural network model type, a forest model type, and a cluster model type. The different model types use different techniques and/or computer algorithms to produce an outcome for the model based on the set of inputs. In some embodiments, the risk assessment models 210 and 212 obtained by the risk analysis module 132 may be implemented based on different types of computer models. For example, the risk assessment model 210 may be implemented based on a neural network model type while the risk assessment model 212 may be implemented based on a forest model type.

The different risk assessment models 210 and 212 may also be developed separately and by different software developers. As such, each of the risk assessment models 210 and 212 may be implemented to use a different data format, and/or have a different interface. Contributing to the fact that the risk assessment models 210 and 212 may be implemented based on different computer model types, the risk assessment models 210 and 212 may be incompatible with each other. As a result, multiple model engines may be required to utilize the risk assessment models 210 and 212. A model engine is a piece of software that enables the risk analysis module 132 to interface with a risk assessment model in order to evaluate an electronic transaction request. For example, a first customized model engine may be developed for utilizing the risk assessment model 210 and a second customized model engine may be developed for utilizing the risk assessment model 212 to evaluate electronic transaction requests. Furthermore, in the event that one desires to utilize both risk assessment models 210 and 212 together to evaluate a transaction request (e.g., when it is desirable to evaluate a transaction based on more than one fraud tactic), a third customized model engine may be required. As the number of risk assessment models increase, the number of customized model engines required to run these models also increases dramatically, thereby substantially increasing the cost of operating the risk analysis module 132.

Figure 3:
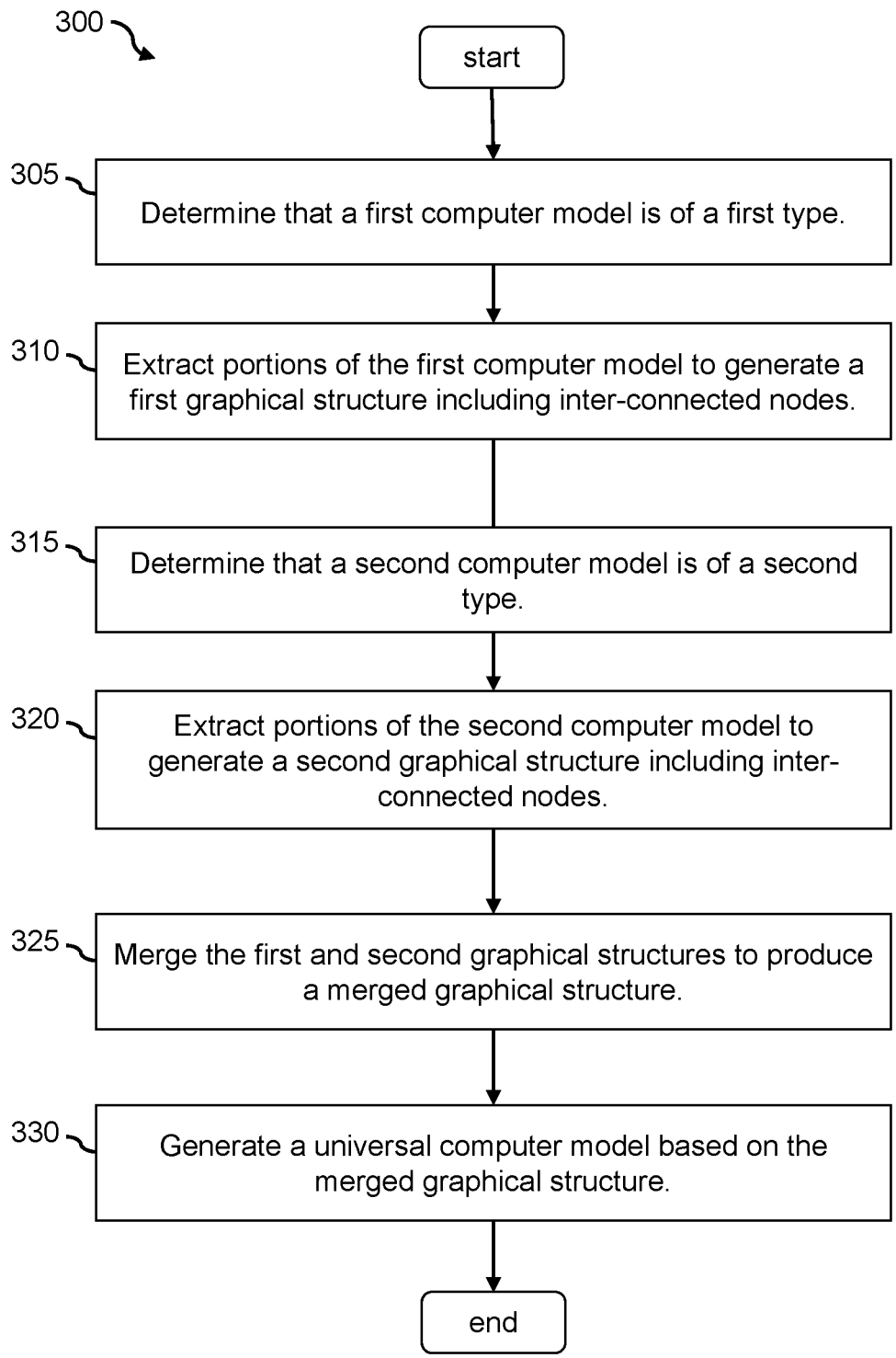
FIG. 3 is a flowchart showing a process of generating a universal computer model according to an embodiment of the present disclosure.
Figure 4:
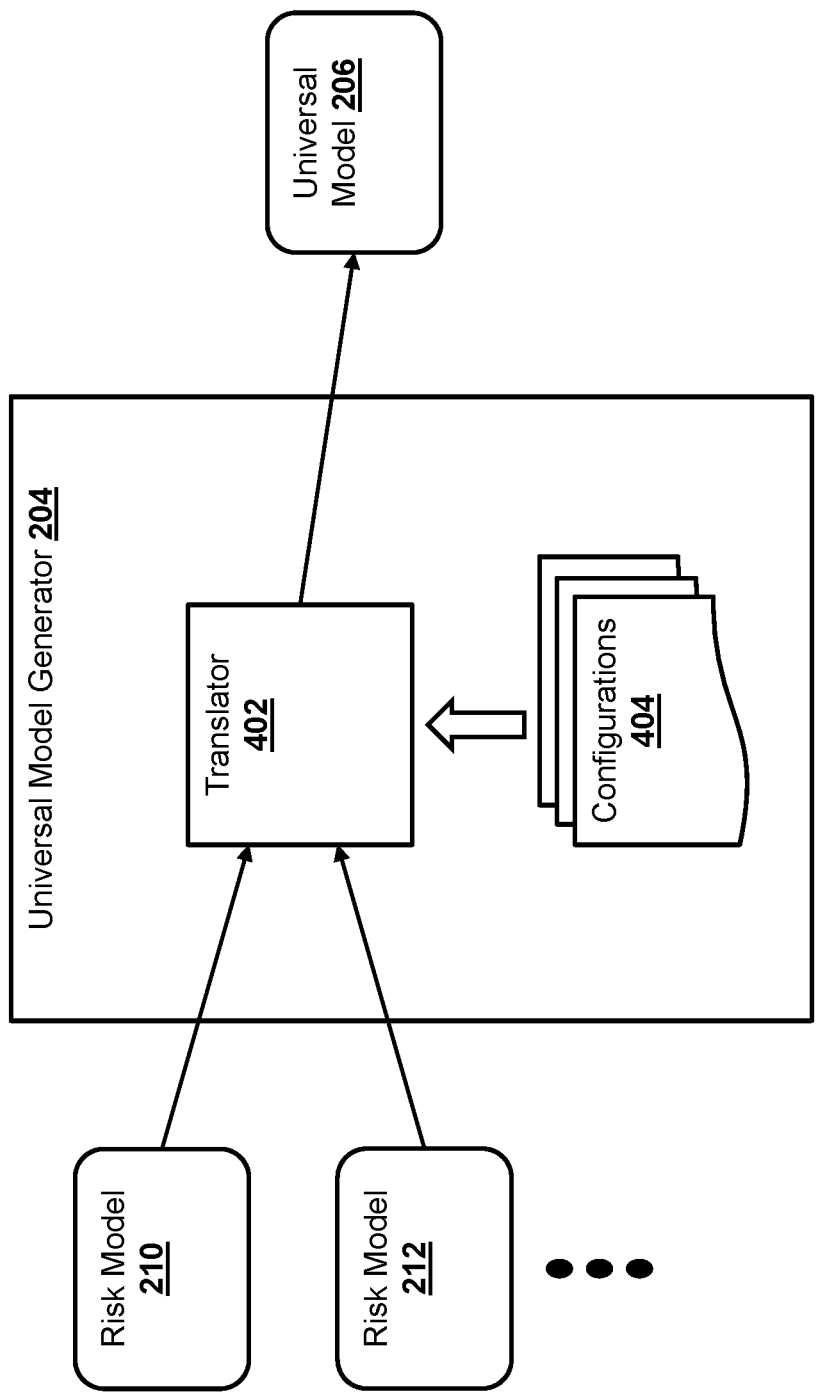
FIG. 4 is a block diagram illustrating a universal model generator according to an embodiment of the present disclosure.

As such, according to various embodiments of the disclosure, a universal computer model may be generated based on one or more risk assessment models. In some embodiments, the universal model has a universal interface such that only one model engine is ever required to interact with multiple risk assessment models. FIG. 3 illustrates a process 300 for generating such a universal model. In some embodiments, the process 300 may be performed by the universal model generator 204 of the risk analysis module 132. FIG. 3 will be discussed with FIG. 4, which is a block diagram of the universal model generator 204. As shown in FIG. 4, the universal model generator 204 of some embodiments may include a translator 402 and configuration files 404.

As discussed above, the universal model generator 204 may receive and/or obtain multiple risk assessment models, such as risk assessment models 210 and 212. The universal model generator 204 may generate a universal model 206 based on one or more of the received risk assessment models. At step 305, the process 300 determines that a first computer model is of a first computer model type. For example, the universal model generator 204 may determine that the risk assessment model 210 is of a first computer model type (e.g., a regression model type). Different embodiments of the universal model generator 204 use different techniques to determine a computer model type for the risk assessment model 210. In some embodiments, the universal model generator 204 may parse the risk assessment model 210 to identify characteristics that correspond to a particular computer model type. For example, the universal model generator 204 may generate or obtain an abstract syntax tree for the risk assessment model 210, and may parse the abstract syntax tree to identify the characteristics that correspond to the particular computer model type.

Typically, a risk assessment model of a regression model type includes a regression construct that receives multiple input values to produce an output value. A risk assessment model of a neural network model type includes one or more hidden layers of constructs that feed outputs from one layer to another layer. A risk assessment model of a forest model type includes a tree-like logic to deduce the set of input values to one output. A risk assessment model of a cluster model type includes comparisons of the set of input values to attributes of one or more clusters. By parsing the abstract syntax tree of the risk assessment model 210, the universal model generator 204 may determine that the risk assessment model 210 is of a particular computer model type based on characteristics identified in the abstract syntax tree.

In other embodiments, the corresponding computer model type may be stored as metadata in the risk assessment model 210. As such, the universal model generator 204 may retrieve the metadata from the risk assessment model 210 to determine the corresponding computer model type of the risk assessment model 210.

In some embodiments, each of the configuration files 404 includes information related to an extraction scheme that corresponds to a particular computer model type. For example, the configuration files 404 may include a configuration file that stores information related to a first extraction scheme corresponding to a regression model type, a configuration file that stores information related to a second extraction scheme corresponding to a neural network model type, a configuration file that stores information related to a third extraction scheme corresponding to a forest model type, and a configuration file that stores information related to a fourth extraction scheme corresponding to a cluster model type. Each extraction scheme provides instructions to the translator 402 to identify portions of a risk assessment model to be extracted based on the computer model type. Based on the computer model types determined for the risk assessment models 210 and 212, the configuration files 404 that store the corresponding extraction schemes may be retrieved. For example, based on a determination that the risk assessment model 210 is of a regression model type, an extraction scheme associated with a regression model type may be retrieved for the risk assessment model 210. Similarly, based on a determination that the risk assessment model 212 is of a neural network model type, an extraction scheme associated with a neural network model type may be retrieved for the risk assessment model 212.

At step 310, the process 300 extracts different portions of the first computer model to generate a first node structure including inter-connected nodes. For example, when it is determined that the risk assessment model 210 is of a regression model type, the translator 402 may use an extraction scheme that corresponds to the regression model type to extract portions from the risk assessment model 210. Based on the regression model type, the translator 402 may extract portions from the risk assessment model 210 that correspond to one or more input elements for the risk assessment model 210, may extract portions from the risk assessment model 210 that correspond to one or more regression computations based on the input elements, and may extract portions from the risk assessment model 210 that correspond to an output element for the risk assessment model 210.

Figure 5:
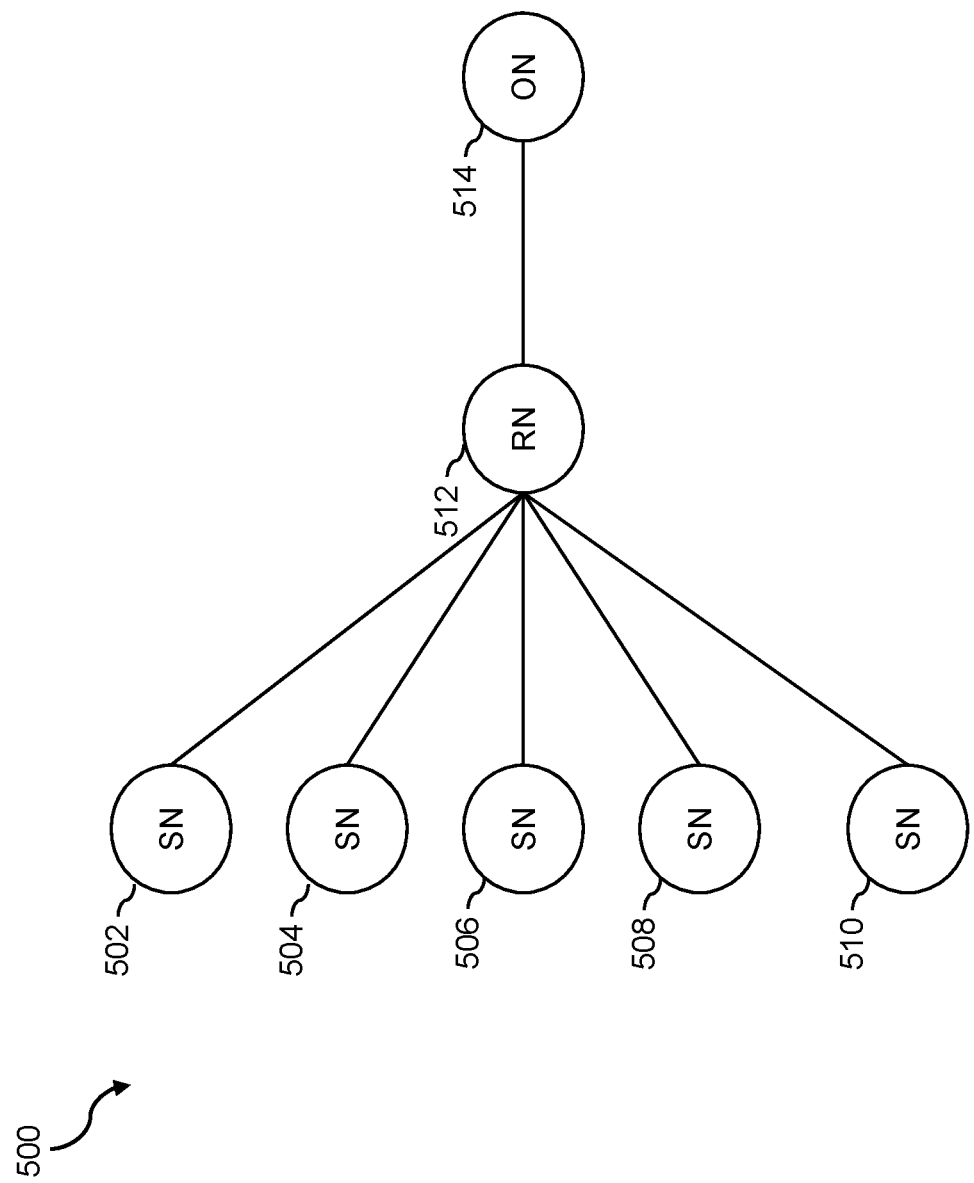
FIG. 5 illustrates an exemplary node structure according to an embodiment of the present disclosure.

The translator 402 may then use the extracted portions to generate a node structure including inter-connected nodes. FIG. 5 illustrates an example node structure 500 that is generated from a risk assessment model that is of a regression model type. As shown, the node structure 500 includes input nodes 502-510, a regression node 512, and an output node 514. All of the input nodes 502-510 are connected to the regression node 512, and the regression node 512 is in turn connected to the output node 514. In some embodiments, the translator 402 may generate the input nodes 502-510 based on the portions extracted from the risk assessment model 210 that correspond to various input elements of the risk assessment model 210. In one embodiment, each input node from the input nodes 502-510 corresponds to an input element from the risk assessment model 210. As discussed above, the input elements may include one or more of a transaction amount, a transaction history of the user account related to the transaction request, an Internet Protocol (IP) address of a source device that initiates the transaction request, a number of successful transactions with the user account within a predetermined period of time, a number of failed transactions with the user account within the predetermined period of time, a time, a browser type, a device type, or a transaction type of the transaction, or other information related to the transaction request.

In some embodiments, in addition to storing information related to the input elements from the risk assessment model 210, each of the input nodes 502-510 may provide additional transformation functionalities for the input elements. As discussed above, different risk assessment models may use different data formats in the model, which causes incompatibility among the risk assessment models. For example, the risk assessment model 210 may express a month as a numeric value (e.g., 1, 2, 3 . . . 12, etc.) and the risk assessment model 212 may express a month as a string (e.g., "January," "February," "March," etc.) In another example, the risk assessment model 210 may express the same type of data in different scales (e.g., a scale of 1-10 and a scale of 1-100). In some embodiments, the universal computer model may use a standardized data format and/or a standardized scale for each data variable type such that multiple risk assessment models may be incorporated into one universal computer model. As such, the input node may perform translation and/or normalization for the corresponding input element based on the risk assessment model 210 (e.g., translating an input from the standardized format/standardized scale to the proprietary format/proprietary scale of the risk assessment model 210). For example, an input node that represents the month input element may transform the input from a numeric value (the standardized format) to a string value (the proprietary format for the risk assessment model 210).

In some embodiments, the translator 402 may generate the regression node 512 based on the one or more portions extracted from the risk assessment model 210 that correspond to one or more regression computations. The regression computations take the input elements and produce an output element (e.g., a score representing a likelihood that a transaction is a fraudulent transaction, etc.). The connections between each of the input nodes 502-510 and the regression node 512 indicate that the regression node 512 receives a value from each of the input nodes 502-510 for the regression computations.

The translator 402 may generate the output node 514 based on the one or more portions extracted from the risk assessment model 210 that correspond to an output element of the risk assessment model 210. In some elements, the output element corresponds to an output produced by the regression node 512. Similar to the input nodes 502-510, in some embodiments, in addition to storing information related to the output element, the output node 514 may also perform translation or normalization (e.g., translating the output of the regression node 512 from the proprietary format/proprietary scale to the standardized format/standardized scale) such that the output value is in the standardized format and normalized to the standardized scale for the universal computer model 206. For example, the universal computer model 206 may be configured to generate an output score based on a scale of 1-100, while the risk assessment model 210 may be configured to provide an output score based on a scale of 1-10. In this example, the output node 514 may include a function to normalize the output value from the regression node 512 to the standardized scale of 1-100 (e.g., by multiplying the output value from the regression node 512 by 10).

When it is determined that the risk assessment model 210 is of a neural network model type, the translator 402 may use an extraction scheme that corresponds to the neural network model type to extract different portions from the risk assessment model 210. A risk assessment model that is of the neural network model type typically includes a neural network comprising inter-connected layers of constructs. The neural network may include an input layer comprising input constructs corresponding to input elements of the risk assessment model. The neural network may also include one or more hidden layers of constructs, and an output layer comprising a construct corresponding to an output element of the risk assessment model.

Based on the extraction scheme that corresponds to the neural network model type, the translator 402 may extract portions from the risk assessment model 210 that correspond to one or more input elements in the input layer of the risk assessment model 210, may extract portions from the risk assessment model 210 that correspond to one or more regression computations in the hidden layer of the risk assessment model 210, and may extract portions from the risk assessment model 210 that correspond to an output element in the output layer of the risk assessment model 210.

Figure 6:
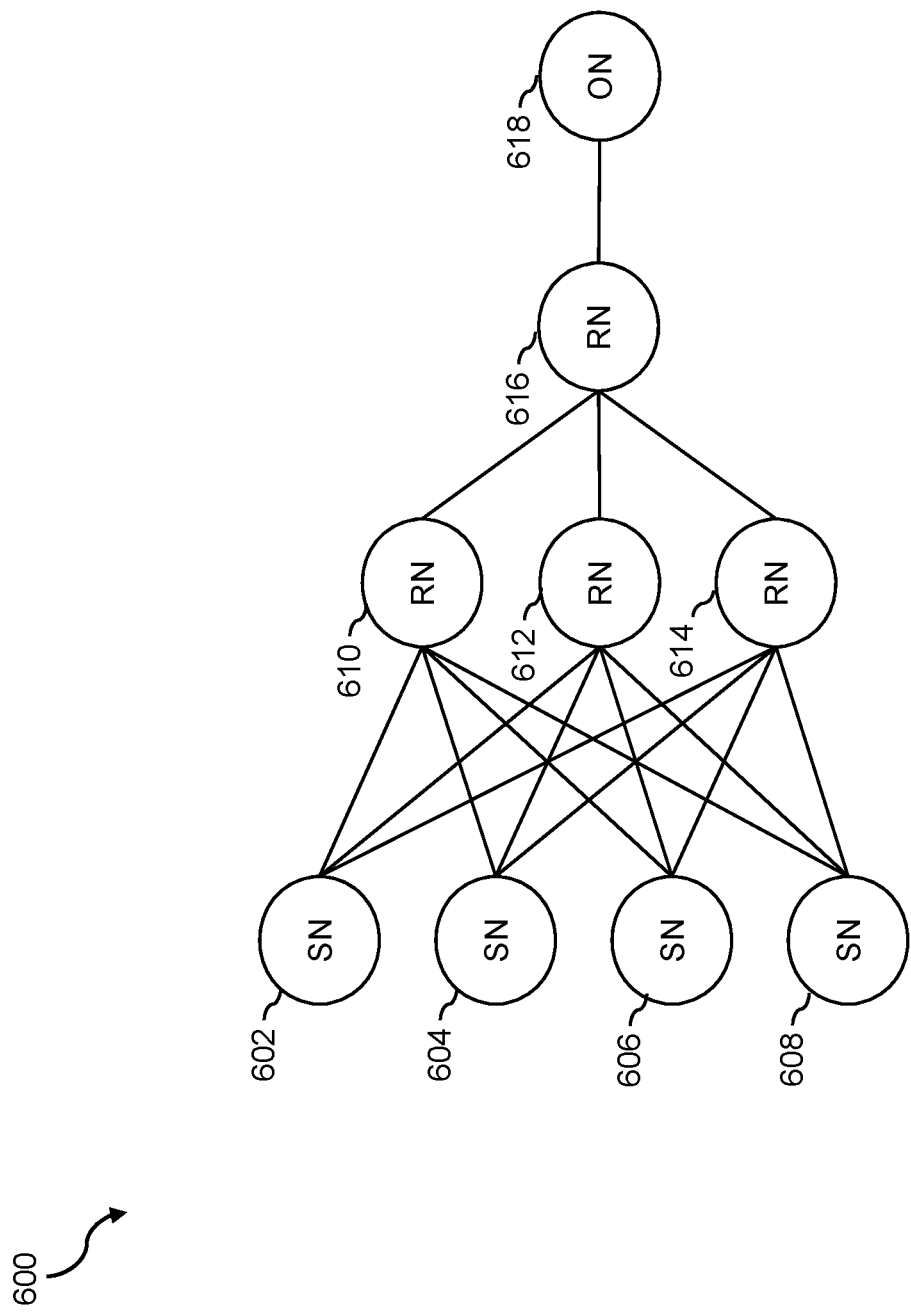
FIG. 6 illustrates another exemplary node structure according to an embodiment of the present disclosure.

The translator 402 may then use the extracted portions to generate a node structure including inter-connected nodes. FIG. 6 illustrates an example node structure 600 that is generated from a risk assessment model that is of a neural network model type. As shown, the node structure 600 includes nodes that correspond to the constructs of the neural network. Specifically, the node structure 600 in this example includes input nodes 602-608 representing the constructs in the input layer of the neural network, regression nodes 610-616 representing the constructs in the hidden layers of the neural network, and an output node 618 representing the construct in the output layer of the neural network. In this example, the neural network includes two hidden layers, as indicated by the two layers of nodes in the node structure 600, where the regression nodes 610-614 represent a first hidden layer and the regression node 616 represent a second hidden layer of the neural network.

One of the characteristics of a neural network model type is that the constructs between two adjacent layers may be fully connected. As shown, the input nodes 602-608 that represent the constructs of the input layer in the neural network are fully connected to the regression nodes 610-614 representing the constructs in the first hidden layer. In other words, each of the input nodes 602-608 is connected to every regression node in the first layer (the regression nodes 610-614). Similarly, the regression nodes 610-614 representing the constructs in the first hidden layer of the neural network are fully connected to the regression node 616 representing the construct in the second hidden layer of the neural network, and the regression node 616 representing the construct in the second hidden layer of the neural network is connected to the output node 618 representing the construct in the output layer of the neural network.

In some embodiments, the translator 402 may generate the input nodes 602-608 based on the portions extracted from the risk assessment model 210 that correspond to various input elements (the constructs in the input layer) of the risk assessment model 210. In one embodiment, each input node from the input nodes 602-608 corresponds to an input element (a construct from the input layer) from the risk assessment model 210. Similar to the input nodes 502-510, the translator 402 may generate the input nodes 602-608 to provide additional transformation and/or normalization of the input elements (e.g., translating the input from the standardized format/standardized scale to the proprietary format/proprietary scale).

In some embodiments, the translator 402 may generate the regression nodes 610-618 based on the portions extracted from the risk assessment model 210 that correspond to the constructs in the hidden layers of the neural network. Each of the regression nodes 610-618 may include one or more regression computations that take one or more inputs to produce an output for one or more node in a subsequent layer. For example, each of the regression nodes 610-614 in the first hidden layer is generated to take inputs received from each of the input nodes 602-608 and produce an output using the corresponding one or more regression computations. The output from each of the regression nodes 610-614 may then be transmitted to the regression node 616 in the second hidden layer. Similarly, the regression node 616 in the second hidden layer is generated to take inputs for each of the regression nodes 610-614 in the first hidden layer and produce an output using the corresponding one or more regression computations. The output from the regression node 616 may then be transmitted to the output node 618.

The translator 402 may generate the output node 618 based on the one or more portions extracted from the risk assessment model 210 that correspond to an output element of the risk assessment model 210. In some elements, the output element corresponds to an output produced by the regression node 616. Similar to the input nodes 602-608, in some embodiments, in addition to storing information related to the output element, the output node 618 may also perform translation or normalization (e.g., translating the output of the regression node 616 from the proprietary format/proprietary scale to the standardized format/standardized scale) such that the output value is in the standardized format and normalized to the standardized scale for the universal computer model 206.

When it is determined that the risk assessment model 210 is of a forest model type, the translator 402 may use an extraction scheme that corresponds to the forest model type to extract portions from the risk assessment model 210. A risk assessment model that is of the forest model type typically includes a set of input elements, one or more tree-based logics to produce an output based on a set of inputs, and an output element. Each tree-based logic may be represented by a tree-like structure that gathers input variables (the input elements). The tree-based logic may work through the branches in the tree structure (and perform computations required by the branches) until it reaches a leaf of the tree-like structure, which produces an output element. If the risk assessment model includes more than one tree-based logic, the translator 204 may determine that the risk assessment model may also include one or more regression computation that takes the outputs from each of the tree-based logics to produce an output element for the risk assessment model.

Based on the extraction scheme that corresponds to the forest model type, the translator 402 may extract portions from the risk assessment model 210 that correspond to one or more input elements in the risk assessment model 210, may extract portions from the risk assessment model 210 that correspond to one or more tree-based logics and possibly one or more regression computations in the risk assessment model 210, and may extract portions from the risk assessment model 210 that correspond to an output element in the risk assessment model 210.

Figure 7:
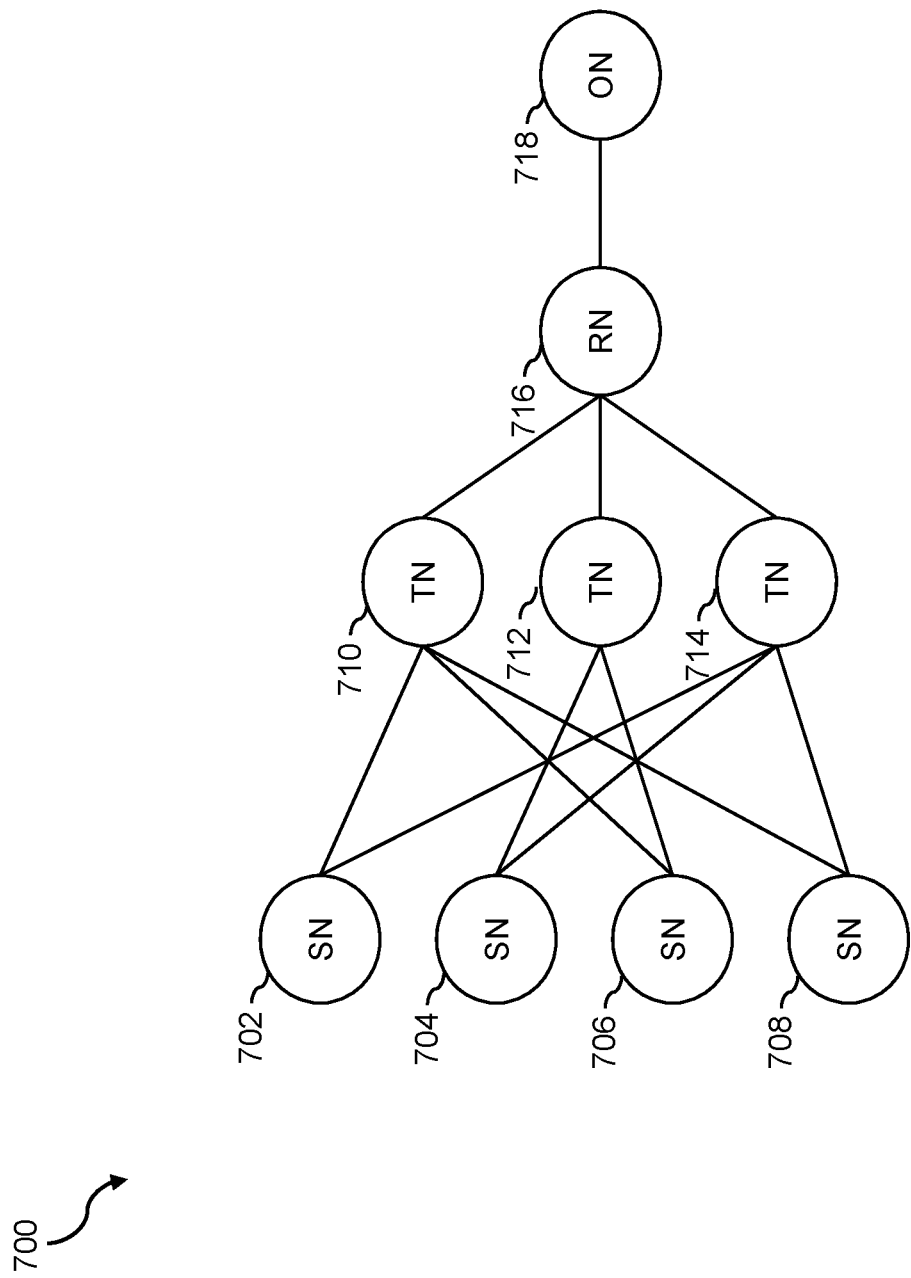
FIG. 7 illustrates another exemplary node structure according to an embodiment of the present disclosure.

The translator 402 may then use the extracted portions to generate a node structure including inter-connected nodes. FIG. 7 illustrates an example node structure 700 that is generated from a risk assessment model that is of a forest model type. As shown, the node structure 700 includes input nodes 702-708, tree nodes 710-714, a regression node 716, and an output node 718. In some embodiments, the translator 402 may generate the input nodes 702-708 based on the portions extracted from the risk assessment model 210 that correspond to various input elements of the risk assessment model 210. In one embodiment, each input node from the input nodes 702-708 corresponds to an input element from the risk assessment model 210. Similar to the input nodes 502-510, the translator 402 may generate the input nodes 702-708 to provide additional transformation and/or normalization of the input elements (e.g., translating the input from the standardized format/standardized scale to the proprietary format/proprietary scale).

In some embodiments, each of the tree nodes 710-714 corresponds to a tree-based logic in the risk assessment model 210. The connection between a tree node and an input node is determined by what types of inputs that the tree-based logic corresponding to the tree node requires to produce an output. The translator 402 may parse and analyze the portions extracted from the risk assessment model 210 corresponding to a tree-based logic of a tree node to determine the types of input required for the tree-based logic, and connects the input nodes corresponding to the determined types of input to the tree node. In this example, based on the parsing and analyzing of the portions extracted from the risk assessment model 210 corresponding to the tree-based logics, the translator 402 connects the tree node 710 to the input nodes 702, 706, and 708, connects the tree node 712 to the input nodes 704 and 706, and connects the tree node 714 to the input nodes 702, 704, and 708.

Each of the tree nodes 710-714 is connected to the regression node 716. As discussed above, the regression node 716 may include one or more regression computations that compute an output element based on the values produced by the tree nodes 710-714. The output element is then transmitted to the output node 718.

The translator 402 may generate the output node 718 based on the one or more portions extracted from the risk assessment model 210 that correspond to an output element of the risk assessment model 210. In some elements, the output element corresponds to an output produced by the regression node 716. Similar to the input nodes 702-708, in some embodiments, in addition to storing information related to the output element, the output node 718 may also perform translation or normalization (e.g., translating the output of the regression node 716 from the proprietary format/proprietary scale to the standardized format/standardized scale) such that the output value is in the standardized format and normalized to the standardized scale for the universal computer model 206.

When it is determined that the risk assessment model 210 is of a cluster model type, the translator 402 may use an extraction scheme that corresponds to the cluster model type to extract portions from the risk assessment model 210. A risk assessment model that is of the cluster model type typically includes a set of input elements representing attributes of a transaction request, multiple clusters, and an output element indicating a particular cluster that has the minimum distance from transaction request based on the input elements. Each of the clusters may include attributes that represent a specific scenario, for example, a particular type of fraudulent transaction. Furthermore, the risk assessment model may also include, for each cluster, computations that calculate a distance from a transaction request to the cluster based on the input variables.

Based on the extraction scheme that corresponds to the cluster model type, the translator 402 may extract portions from the risk assessment model 210 that correspond to one or more input elements in the risk assessment model 210, may extract portions from the risk assessment model 210 that correspond to one or more clusters in the risk assessment model 210 and portions from the assessment model 210 that correspond to the computations for calculating distances to the clusters in the risk assessment model 210, and may extract portions from the risk assessment model 210 that correspond to an output element in the risk assessment model 210.

Figure 8:
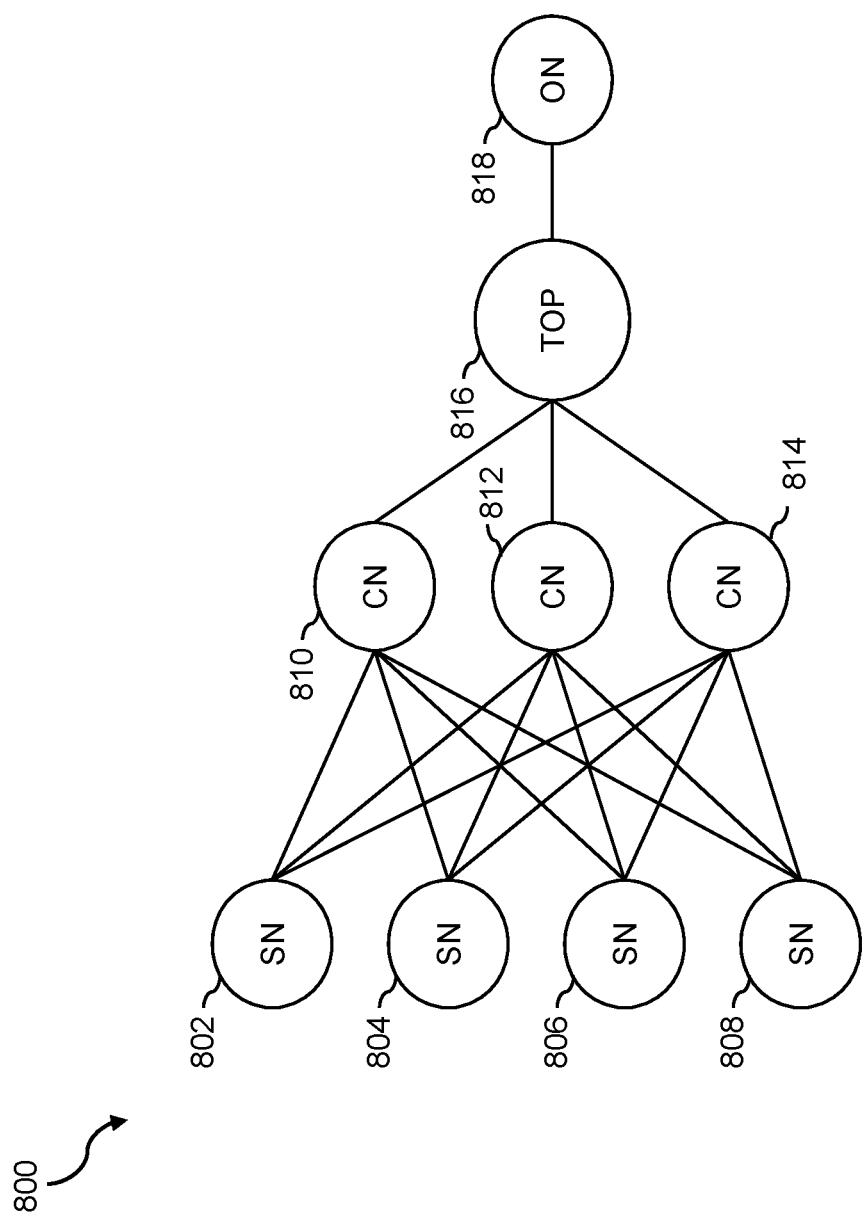
FIG. 8 illustrates yet another exemplary node structure according to an embodiment of the present disclosure.

The translator 402 may then use the extracted portions to generate a node structure including inter-connected nodes. FIG. 8 illustrates an example node structure 800 that is generated from a risk assessment model that is of a cluster model type. As shown, the node structure 800 includes input nodes 802-808 that correspond to the input elements of the risk assessment model 210, and an output node 818 that corresponds to the output element of the risk assessment model 210. The node structure 800 also includes centroid nodes 810-814, where each of the centroid nodes 810-814 corresponds to a cluster in the risk assessment model 210. For example, each centroid node may include attributes of the corresponding cluster extracted from the risk assessment model 210. In addition, each centroid node may also include the computations, extracted from the risk assessment model 210, for calculating a distance between a transaction request and the corresponding cluster based on the input variables. As such, each of the centroid nodes 810-814 may produce an output that indicates the calculated distance. Since the centroid nodes 810-814 may have different attributes, the calculated distances may also be different. The outputs from the centroid nodes 810-814 may be transmitted to a top node 816, which is generated to compare the distances calculated by the centroid nodes 810-814 and determine a cluster that has the minimum distance based on the input variables. The top node 816 may then provide an identity of the cluster having the minimum distance (and optionally the minimum distance) to the output node 818.

The translator 402 may generate the output node 818 based on the one or more portions extracted from the risk assessment model 210 that correspond to an output element of the risk assessment model 210. In some elements, the output element corresponds to an output produced by the top node 816. Similar to the input nodes 802-808, in some embodiments, in addition to storing information related to the output element, the output node 818 may also perform translation or normalization (e.g., translating the output of the top node 816 from the proprietary format/proprietary scale to the standardized format/standardized scale) such that the output value is in the standardized format and normalized to the standardized scale for the universal computer model 206.

As such, depending on a computer model type determined for the risk assessment model 210, the translator 402 may generate a corresponding node structure. At this point, the translator 402 may generate a universal model 206 based on the node structure generated for the risk assessment model 210. The universal model 206 may then be run by the model engine 208 to evaluate transaction requests. However, in some embodiments, the translator may combine multiple risk assessment models (combining the functionalities from the multiple risk assessment models) to form the universal model 206, such that the universal model 206 may evaluate transaction requests based on multiple risk assessment models.

Thus, referring back to FIG. 3, at step 315, the process 300 receives a second risk assessment model and determines that the second risk assessment model is of a second computer model type. For example, the universal model generator 204 may receive the risk assessment model 212, and performs an analysis on the risk assessment model 212 in a similar manner as described above in step 305. In some embodiments, the computer type of the risk assessment model 210 may be different than the computer type of the risk assessment model 212. For example, the risk assessment model 210 may be of a neural network model type while the risk assessment model 212 may be of a forest model type.

In step 320, the process 300 extracts portions of the second computer model based on the second computer type to generate a second node structure. For example, the translator 402 may use similar techniques describe above in step 310 to extract different portions of the risk assessment model 212 to generate a node structure. The node structure generated for the risk assessment model 212 may be similar to the node structure 500, the node structure 600, the node structure 700, or the node structure 800, depending on the type of computer model determined for the risk assessment model 212.

After generating the second node structure for the second risk assessment model, the process 300 merges (at step 325) the first and second node structures to produce a merged node structure. For example, the translator 402 may merge the node structures generated for the risk assessment model 210 and the risk assessment model 212. First, the translator may combine the input nodes from the node structure (referred to as the "first node structure") generated for the risk assessment model 210 and the input nodes from the node structure (referred to as the "second node structure") generated for the risk assessment model 212 to produce a combined set of input nodes (as a first layer) for the merged node structure. The translator may insert the remaining of the node structures to the merged node structure in a second layer of the merged node structure. The remaining of the node structures remains connected to the corresponding input nodes in the first layer.

The translator 402 may then analyze the combined input nodes to determine if there are any common input nodes. Two input nodes are common when both input nodes correspond to the same type of attribute of a transaction request. For example, When it is determined that an input node from the first node structure and an input node from the second node structure both correspond to an IP address of a source device that initiates the transaction request, the translator 402 may determine that the two nodes are common. The translator 402 may then combine common nodes in the merged node structure.

Figure 9:
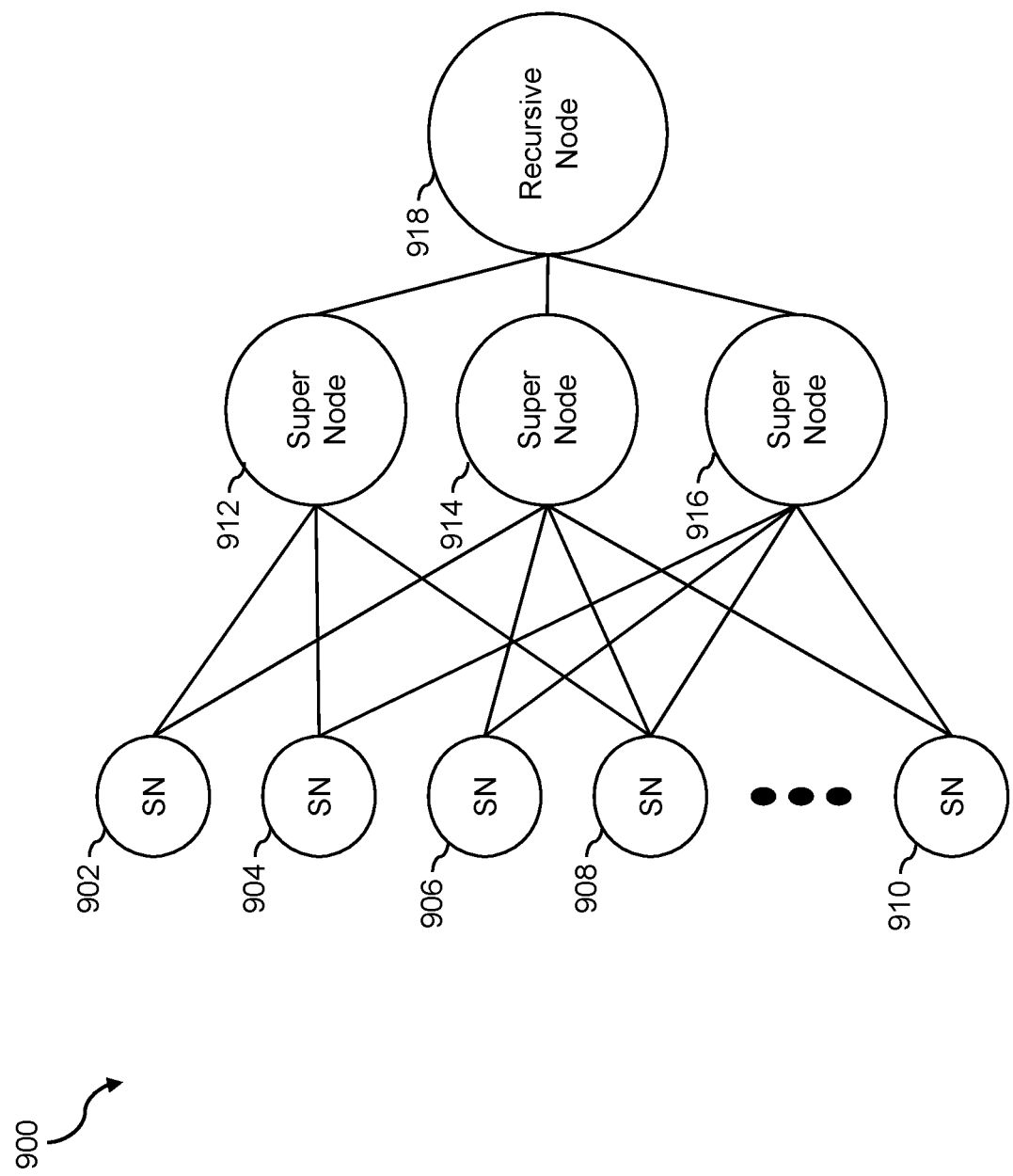
FIG. 9 illustrates an exemplary merged node structure according to an embodiment of the present disclosure.

FIG. 9 illustrates an example merged node structure 900 that is generated based on three different node structures generated based on three risk assessment models. As shown, the merged node structure 900 includes input nodes 902-910. Super nodes 912-916 represent the three underlying node structures generated from different risk assessment models, respectively, without the input nodes. At least some of the input nodes 902-910 are combined from common input nodes found in the underlying node structures. For example, the input node 902 may be generated by combining the input nodes from the node structure represented by the super node 912 and the node structure represented by the super node 914. The input node 904 may be generated by combining the input node from the node structure represented by the super node 912 and the node structure represented by the super node 916, and so on.

The combined node (e.g., the nodes 902, 904, etc.) may include the input element and also the transformations and/or normalizations that are needed to be performed on the input element in order for the respective super node to process the input elements. For example, the input node 902 may include the necessary transformation and/or normalization that turns the input element of the input node 902 from the standardized format/standardized scale to the proprietary format/proprietary scale for the risk assessment model corresponding to the super node 912, and also the necessary transformation and/or normalization that turns the input element of the input node 902 from the standardized format/standardized scale to the proprietary format/proprietary scale for the risk assessment model corresponding to the super node 914. As such, when the input node 902 receives an input variable (from a transaction request), the input node 902 may perform the necessary transformations and/or normalizations to generate a customized input for the super node 912 and a customized input for the super node 914. Since the risk assessment models corresponding to the super nodes 912 and 914 may use different data formats, the customized input generated for the super node 912 may be different from the customized input generated for the super node 914.

Each of the super nodes 912-914 may obtain input variables from the corresponding input nodes and produce an output according to the logic/algorithm of the corresponding underlying node structure. As shown in FIG. 9, the merged node structure 900 also includes a recursive node 918 with logic that produces an output for the merged node structure 900 based on the outputs generated by each of the super nodes 912-916. The logic may be obtained from a user via a graphical user interface of the universal model generator 204. For example, when each of the super nodes 912-916 produces an output that indicates a likelihood that the transaction request is a fraudulent request, the logic may include taking an average of the three outputs generated by the super nodes 912-916. The recursive node 918 may also store different weights assigned to each of the super nodes 912-916. The different weights may also be applied to the output from each of the super nodes 912-916 when producing the ultimate output for the merged node structure.

After the merged node structure is generated, the process 300 then generates the universal model 206 based on the merged node structure. As shown in FIG. 9, the merged node structure 900 represents a logic flow of how an output may be produced based on a set of inputs corresponding to the input nodes of the merged node structure. In some embodiments, the universal model 206 may be generated by implementing the logic flow using a particular computer language (e.g., Python, Java, etc.).

Since the universal model 206 has a universal interface, only one model engine (e.g., the model engine 208) is necessary to utilize the universal model 206 to evaluate a transaction request. In some embodiments, the risk analysis module 132 may use the universal model generator 204 to generate different universal models based on different risk assessment models or different combinations of risk assessment models. Once generated, the risk analysis module 132 may evaluate incoming transaction requests using the same model engine 208. The risk analysis module 132 may apply different risk analysis using universal computer models generated from different risk assessment models based on the techniques disclosed herein.

FIG. 10 is a block diagram of a computer system 1000 suitable for implementing one or more embodiments of the present disclosure, including the service provider server 130, the merchant server 120, and the user device 110. In various implementations, the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, and 130 may be implemented as the computer system 1000 in a manner as follows.

The computer system 1000 includes a bus 1012 or other communication mechanism for communicating information data, signals, and information between various components of the computer system 1000. The components include an input/output (I/O) component 1004 that processes a user (i.e., sender, recipient, service provider) action, such as selecting keys from a keypad/keyboard, selecting one or more buttons or links, etc., and sends a corresponding signal to the bus 1012. The I/O component 1004 may also include an output component, such as a display 1002 and a cursor control 1008 (such as a keyboard, keypad, mouse, etc.). The display 1002 may be configured to present a login page for logging into a user account or a checkout page for purchasing an item from a merchant. An optional audio input/output component 1006 may also be included to allow a user to use voice for inputting information by converting audio signals. The audio I/O component 1006 may allow the user to hear audio. A transceiver or network interface 1020 transmits and receives signals between the computer system 1000 and other devices, such as another user device, a merchant server, or a service provider server via network 1022. In one embodiment, the transmission is wireless, although other transmission mediums and methods may also be suitable. A processor 1014, which can be a micro-controller, digital signal processor (DSP), or other processing component, processes these various signals, such as for display on the computer system 1000 or transmission to other devices via a communication link 1024. The processor 1014 may also control transmission of information, such as cookies or IP addresses, to other devices.

The components of the computer system 1000 also include a system memory component 1010 (e.g., RAM), a static storage component 1016 (e.g., ROM), and/or a disk drive 1018 (e.g., a solid state drive, a hard drive). The computer system 1000 performs specific operations by the processor 1014 and other components by executing one or more sequences of instructions contained in the system memory component 1010. For example, the processor 1014 can perform the risk analysis model generation functionalities described herein according to the process 300.

Logic may be encoded in a computer readable medium, which may refer to any medium that participates in providing instructions to the processor 1014 for execution. Such a medium may take many forms, including but not limited to, non-volatile media, volatile media, and transmission media. In various implementations, non-volatile media includes optical or magnetic disks, volatile media includes dynamic memory, such as the system memory component 1010, and transmission media includes coaxial cables, copper wire, and fiber optics, including wires that comprise the bus 1012. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 1000. In various other embodiments of the present disclosure, a plurality of computer systems 1000 coupled by the communication link 1024 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method comprising:
    extracting, from a first neural network configured to assess a first type of transaction risk, a first portion of computation nodes according to a first extraction scheme;
    generating a first node structure comprising a first plurality of inter-connected nodes based on the extracted first portion of computation nodes;
    extracting, from a second neural network configured to assess a second type of transaction risk, a second portion of computation nodes according to a second extraction scheme;
    generating a second node structure comprising a second plurality of inter-connected nodes based on the extracted second portion of computation nodes;
    merging the first node structure and the second node structure;
    generating a universal neural network based on the merging;
    receiving a transaction request from a user device;
    assessing a risk associated with the transaction request using the universal neural network; and
    processing the transaction request based on the risk.

2. The method of claim 1, wherein the extracting the first portion of computation nodes from the first neural network comprises:
    identifying a particular portion within the first neural network corresponding to a first input element; and
    extracting a first computation node from the particular portion of the first neural network.

3. The method of claim 2, wherein the generating the first node structure comprises generating a first input node corresponding to the first input element.

4. The method of claim 1, wherein the merging first node structure and the second node structure comprises:
    identifying a first computation node comprising a first logic from the first portions of computation nodes;
    identifying a second computation node comprising a second logic from the second portions of computation nodes; and
    generating a recursive node based on combining a first output from the first computation node and a second output from the second computation node.

5. The method of claim 4, further comprising connecting the first computation node and the second computation node to the recursive node.

6. The method of claim 4, wherein the first computation node is configured to receive a value from a first input node and generate the first output based on the value using the first logic.

7. The method of claim 4, wherein the recursive node is configured to output a combined output value based on the first and second outputs.

8. The method of claim 1, further comprising:
    determining the first extraction scheme for extracting the first portion of computation nodes based on a first computer model type associated with the first neural network; and
    determining the second extraction scheme for extracting the second portion of computation nodes based on a second computer model type associated with the second neural network.

9. The method of claim 1, wherein the merging the first node structure and the second node structure comprises:
    determining that a first input node from the first node structure and a second input node from the second node structure correspond to input elements of a same type; and
    in response to the determining that the first input node and the second input node correspond to the input elements of the same type, generating a merged input node for the universal neural network based on combining the first input node and the second input node.

10. A system comprising:
    a non-transitory memory; and
    one or more hardware processors coupled with the non-transitory memory and configured to read instructions from the non-transitory memory to cause the system to perform operations comprising:
        extracting, from a first neural network configured to assess a first type of transaction risk, a first portion of computation nodes using a first extraction scheme;
        generating a first node structure comprising a first plurality of inter-connected nodes based on the extracted different first portion of, computation nodes;

extracting, from a second neural network for assessing a second type of transaction risk, a second portion of computation nodes according to a second extraction scheme;

generating a second node structure comprising a second plurality of inter-connected nodes based on the extracted second portion of computation nodes;

merging the first node structure and the second node structure;

generating a universal neural network based on the merging;

receiving a transaction request from a user device;

assessing a risk associated with the transaction request using the universal neural network; and processing the transaction request based on the risk.

11. The system of claim 10, wherein the extracting the first portion of computation nodes from the first neural network comprises:

identifying a particular portion within the first neural network corresponding to a first input element; and extracting a first computation node from the particular portion of the first neural network.

12. The system of claim 11, wherein the generating the first node structure comprises generating a first input node corresponding the first input element.

13. The system of claim 10, wherein the merging the first node structure and the second node structure comprises:

identifying a first computation node comprising a first logic from the first portions of computation nodes;

identifying a second computation node comprising a second logic from the second portions of computation nodes; and generating a recursive node based on combining a first output from the first computation node and a second output from the second computation node.

14. The system of claim 13, wherein the operations further comprise connecting the first computation node and the second computation node to the recursive node.

15. The system of claim 13, wherein the first computation node is configured to receive a value from a first input node and generate the first output based on the value using the first logic.

16. The system of claim 10, wherein the operations further comprise:

determining the first extraction scheme for extracting the first portion of computation nodes based on a first computer model type associated with the first neural network; and determining the second extraction scheme for extracting the second portion of computation nodes based on a second computer model type associated with the second neural network.

17. A non-transitory machine-readable medium having stored thereon machine-readable instructions executable to cause a machine to perform operations comprising:

receiving a transaction request from a user device;

accessing a universal neural network generating by:

extracting, from a first neural network configured to assess a first type of transaction risk, a first portion of computation nodes according to a first extraction scheme;

generating a first node structure comprising a first plurality of inter-connected nodes based on the first portion of computation nodes;

extracting, from a second neural network configured to assess a second type of transaction risk, a second portion of computation nodes according to a second extraction scheme;

generating a second node structure comprising a second plurality of inter-connected connected nodes based on the second portion of computation nodes; and merging the first node structure and the second node structure;

assessing a risk associated with the transaction request using the universal neural network; and processing the transaction request based on the risk.

18. The non-transitory machine-readable medium of claim 17, wherein the merging the first node structure and the second node structure comprises:

determining that a first input node from the first node structure and a second input node from the second node structure correspond to input elements of a same type; and in response to the determining that the first input node and the second input node correspond to the input elements of the same type, generating a merged input node for the universal neural network based on combining the first input node and the second input node.

19. The non-transitory machine-readable medium of claim 18, wherein the universal neural network is generated further by incorporating the merged input node into the universal neural network.

20. The non-transitory machine-readable medium of claim 17, wherein the extracting the first portions from the first neural network comprises:

identifying a particular portion within the first neural network corresponding to a first input element; and extracting a first computation node from the particular portion of the first neural network.

* * * * *